(12) United States Patent
Coupe et al.

(10) Patent No.: US 8,153,539 B2
(45) Date of Patent: Apr. 10, 2012

(54) REINFORCING FIBER TEXTURE WITH MULTIPLE-SATIN WEAVING FOR A COMPOSITE MATERIAL PART

(75) Inventors: Dominique Coupe, Le Haillan (FR); François Charleux, Bordeaux (FR); Jean-Philippe Richard, Le Taillan Medoc (FR)

(73) Assignee: Snecma Propulsion Solide, Le Haillan (FR)

( * ) Notice: Subject to any disclaimer, the term of this patent is extended or adjusted under 35 U.S.C. 154(b) by 351 days.

(21) Appl. No.: 12/339,300

(22) Filed: Dec. 19, 2008

(65) Prior Publication Data

US 2009/0186547 A1   Jul. 23, 2009

Related U.S. Application Data

(63) Continuation of application No. PCT/FR2007/051477, filed on Jun. 20, 2007.

(30) Foreign Application Priority Data

Jun. 21, 2006   (FR) ...................................... 06 52573

(51) Int. Cl.
*D03D 11/00*   (2006.01)
(52) U.S. Cl. ........ 442/207; 442/203; 442/205; 442/206; 442/208; 442/209; 442/239

(58) Field of Classification Search .................. 442/203, 442/205, 206, 207, 208, 209, 239
See application file for complete search history.

(56) References Cited

U.S. PATENT DOCUMENTS

| | | | |
|---|---|---|---|
| 4,510,198 A * | 4/1985 | Rheaume | 442/206 |
| 4,848,414 A | 7/1989 | Cahuzac | |
| 5,102,725 A | 4/1992 | Knox et al. | |
| 5,104,726 A * | 4/1992 | Ross | 442/207 |
| 5,277,959 A * | 1/1994 | Kourtides et al. | 428/116 |
| 5,899,241 A | 5/1999 | David et al. | |
| 2002/0090873 A1 | 7/2002 | Moody | |

FOREIGN PATENT DOCUMENTS

| | | |
|---|---|---|
| JP | 09147976 | 12/1998 |
| JP | 2005 305276 | 11/2005 |

* cited by examiner

*Primary Examiner* — Andrew Piziali
(74) *Attorney, Agent, or Firm* — Weingarten, Schurgin, Gagnebin & Lebovici LLP

(57) ABSTRACT

A reinforcing fiber texture for a composite material part is made by multi-layer three-dimensional weaving with a satin type weave or a multiple satin type weave. The texture comprises at least three layers of weft yarns T interlaced by warp yarns C, each warp yarn taking hold in alternation of one weft yarn in n from a first layer of weft yarns and of one weft yarn in n of a second layer of weft yarns adjacent to the first, the number n being an integer not less than 3. The paths of the warp yarns are similar and they are offset in the warp direction.

27 Claims, 8 Drawing Sheets

← 20

← 20

← 20

20

20

20

REINFORCING FIBER TEXTURE WITH MULTIPLE-SATIN WEAVING FOR A COMPOSITE MATERIAL PART

BACKGROUND OF THE INVENTION

The invention relates to making composite material parts, and more particularly to making reinforcing fiber textures for such parts.

The field of application of the invention is that of making structural parts out of composite material comprising fiber reinforcement and a resin matrix. Such parts are used in very numerous fields, and in particular in the field of aviation. The reinforcing fiber texture is densified with the resin matrix by any known means, for example by resin transfer molding (RTM).

Another field of application of the invention is making parts out of thermostructural composite material, i.e. out of a material having mechanical properties that enable it to constitute structural elements and having the ability to conserve those properties at high temperatures. Thermostructural composite materials are typically carbon/carbon (C/C) composite materials having carbon reinforcement densified with a carbon matrix, and ceramic matrix composite (CMC) materials having refractory fiber reinforcement (carbon fibers or ceramic fibers) densified with a ceramic matrix. Parts made of thermostructural composite material are used in particular in the fields of aviation and space. The reinforcing fiber texture can be densified with the matrix constituting the material by chemical vapor infiltration (CVI) or by a liquid technique, as is well known. Densification by a liquid technique consists in impregnating the fiber structure with a liquid composition containing a precursor for the material constituting the matrix, typically a resin, and the precursor is transformed by heat treatment.

For composite material parts presenting a certain amount of thickness, it is known to make the reinforcing fiber texture as a plurality of superposed layers that are bonded to one another so as to avoid the layers separating.

Proposals have thus been made, for example in documents U.S. Pat. No. 4,848,414, U.S. Pat. No. 5,899,241 and EP 1 526 285, to make a reinforcing texture by three-dimensional weaving with warp yarns that interlace weft yarns belonging to a plurality of different layers of weft yarns. The weave is of the interlock type with the weft yarns being disposed in a staggered relationship in successive weft planes.

U.S. Pat. No. 5,102,725 also discloses a reinforcing fiber texture with weaving of the satin type that is locally three-dimensional. The fiber texture is constituted by two layers of weft yarns interlaced at certain points by a first warp yarn taking hold in alternation of one yarn in four of the first weft yarn layer and one yarn in eight of the second weft yarn layer. The weft yarns of the second layer of weft yarns are also woven with a second warp yarn using conventional satin type two-dimensional weaving, the two warp yarns extending mainly between the two layers of weft yarns. In the second layer of weft yarns, the same weft yarns are taken by the first and second warp yarns, thereby creating surface irregularities. Furthermore, the technique described of weaving with warp yarns both extending between the two layers of weft yarns is suitable specifically for making a fiber texture of thickness that is limited to two layers of weft yarns.

Various aspects need to be taken into consideration when making such reinforcing fiber textures for composite material parts.

Thus, the three-dimensional weaving must provide satisfactory interlacing between layers so as to oppose delamination, but without that affecting mechanical behavior in directions parallel to the planes of the layers.

In addition, for composite material parts that are to present a smooth surface state, it is desirable to avoid the reinforcing fiber texture presenting large surface irregularities that require additional operations in order to eliminate such irregularities, e.g., after an initial densification stage or consolidation stage, operations such as trimming the surface or adding a two-dimensional ply on the surface, e.g. a cloth ply, prior to finishing off densification.

OBJECT AND SUMMARY OF THE INVENTION

An object of the invention is to provide a reinforcing fiber texture made up at least in part by three-dimensional weaving and presenting a good compromise between the above constraints.

According to the invention, this object is achieved by the fact that the three-dimensional weaving is multi-layer weaving with a satin type weave, or multiple-satin weaving, comprising:

at least a first, a second, and a third adjacent layers of weft yarns with the weft yarns of the first, second and third layers being disposed in columns each comprising a weft yarn from each of said layers;

a first set of warp yarns each taking hold in alternation of one warp yarn in n of the first layer of warp yarns and of one warp yarn in n of the second layer of warp yarns adjacent to the first; and a second set of warp yarns each taking hold in alternation of one weft yarn in n of the second layer of weft yarns and of one weft yarn in n of the third layer of weft yarns adjacent to the second;

both sets of warp yarns following similar paths that are offset relative to each other in the warp direction such that in a given weft plane, the yarns of the second weft yarn layer that are taken by a warp yarn of the first set and by a warp yarn of the second set are different; and the number n being an integer not less than 3.

Advantageously, the weft yarns held by a same warp yarn in two of said layers of weft yarns are located in non adjacent columns of weft yarns.

Preferably, n is not less than 5.

The use of a multiple-satin weave presents several advantages.

Firstly, in the warp direction, the mechanical behavior of a satin weave is conserved while interlacing the weft yarn layers.

In addition, a satin type weave enables the cloth to conserve a good degree of deformability so as to enable it to match shapes that are not plane.

For a fiber texture having an inner portion, or core, and an outer portion, or skin, adjacent to an outside surface of the fiber texture, the core is advantageously made at least in part out of such multiple-satin weaving.

The skin can then be formed by two-dimensional weaving. The weaving of the skin may use a satin type weave, contributing to giving a surface appearance that is smooth, and the satin pitch in the skin is then advantageously equal to the satin pitch in a portion of the core of the fiber texture adjacent to the skin. In a variant, the skin may be weaved with a plain weave providing easy access for gas through the skin when performing CVI densification.

It is possible to cause the multiple-satin weave to vary within the core of the fiber texture, e.g. by forming two core portions by multiple-satin weaving with different respective pitches.

According to a feature of the fiber texture, the core is woven with yarns made of discontinuous fibers while the skin is woven with yarns made of continuous filaments. The use of yarns made of discontinuous fibers in the core makes it possible, by bulking up the fibers, to subdivide the pores within the core, while using yarns made of continuous filaments in the skin encourages access for gas during CVI densification and a surface state that is free from significant irregularities. It is thus possible to obtain a reduction in the gradient of CVI densification between the core and the skin.

According to another feature of the fiber texture, at least one of the warp structure and the weft structure varies in the thickness of the fiber texture. The structure may vary in the direction of decreasing the number of yarns per unit length between the core and the skin, thereby enhancing access for gas to the core of the fiber structure during CVI densification.

According to another feature of the fiber texture, the various portions of the fiber structure are made using yarns having different chemical natures, in particular for the purpose of giving them particular desired properties, in particular resistance to oxidation or to wear.

According to yet another feature of the fiber texture, the yarns used for weaving present a yarn count that varies within the fiber structure. In particular, the yarns may become finer on going from a core portion to a skin portion of the fiber texture, so as to facilitate access for gas to the core during CVI densification.

BRIEF DESCRIPTION OF THE DRAWINGS

Embodiments of the invention are described below by way of non-limiting indication. Reference is made to the accompanying drawings, in which.

DEFINITIONS

The term "two-dimensional weaving" or "2D weaving" is used herein to designate a conventional weaving technique whereby each warp yarn passes from one side to the other of yarns in a single weft layer.

The term "three-dimensional weaving" or "3D weaving" is used herein to designate a weaving technique whereby at least some of the warp yarns interlace warp yarns over a plurality of warp layers.

Figure 1:
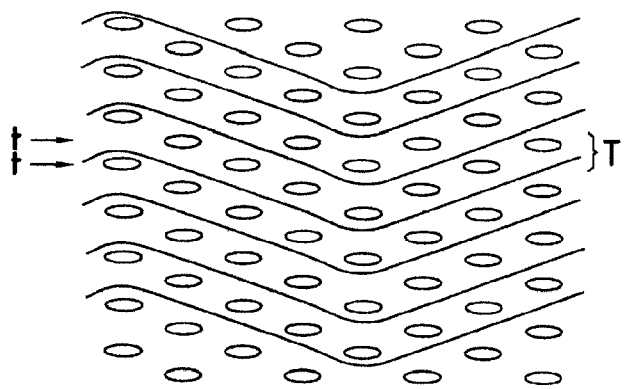
FIG. 1 shows a prior art three-dimensional weave of the interlock type.

The term "interlocking weaving" is used herein to designate a 3D weave in which each warp layer interlaces a plurality of weft layers with all of the yarns of a given warp column having the same movement in the weave plane. FIG. 1 is a view of one of the eight planes of an interlock weave with seven warp layers and eight weft layers. In the interlock weave shown, one weft layer T is made up of two adjacent weft half-layers t that are offset from each other in the warp direction. There are thus 16 weft half-layers positioned in a staggered configuration, each warp interlacing three weft layers. It would also be possible to adopt a position for the weft yarns that is not in a staggered configuration, the weft yarns of two adjacent layers being in alignment on the same column.

The term "multi-layer weaving" is used herein to designate 3D weaving with a plurality of weft layers with the basic weave of each layer being equivalent to a conventional 2D weave, but with certain interlacing points of the weave interlacing the weft layers to one another.

The term "structure" is used herein to designate the number of yarns per unit length both in the weft direction and in the warp direction, such that a low-count (or open) structure means there are fewer yarns, and thus that the cloth is more open in comparison with a structure having a high count (i.e. a closed structure).

The term "continuous filaments" is used herein in conventional manner to designate fiber elements having very great length compared with their diameter. Thus, in the example of a reinforcing texture constituting a preform for a composite material part and made using continuous filaments, at least a very large majority of the filaments extend continuously within the preform, being interrupted only at the geometrical boundaries of the preform. Continuous filaments that are not natural are conventionally obtained by spinning a synthetic material, possibly followed by one or more physico-chemical operations (stretching, oiling, heat treatment, . . . ).

Yarns made up of continuous filaments, or multi-filament yarns, are made by assembling together continuous filaments side by side with or without twisting.

The term "discontinuous fibers" is used herein in conventional manner to designate fiber elements that, with non-natural fibers, are made by cutting or stretch-breaking continuous filaments. Discontinuous fibers or short fibers conventionally have a length of a few millimeters to a few tens of millimeters.

Yarns made up of discontinuous fibers, or fiber yarns, are made by assembling the discontinuous fibers by twisting or by covering, where covering consists in imparting cohesion by winding a covering yarn around a set of discontinuous fibers that may be untwisted or lightly twisted.

Throughout the specification and in all of the drawings, by convention and for reasons of convenience, only those warp yarns that are deflected from their paths to take hold of weft yarns of a weft layer or a plurality of weft layers are mentioned and shown. Nevertheless, the warp and weft roles could be inverted and such inversion should be considered as being covered by the claims.

DETAILED DESCRIPTION OF EMBODIMENTS OF THE INVENTION

The field of application of the invention is that of making fiber textures suitable for constituting fiber reinforcements, or preforms, for fabricating composite material parts, the parts being obtained by densifying fiber textures with the matrix. The matrix may be a resin, for composite materials that are used at relatively low temperatures, typically up to 300° C., or it may be a refractory material such as carbon or ceramic for thermostructural composite materials.

Making the fiber texture by 3D weaving makes it possible, in a single textile operation, to obtain interlacing between the layers, and thus to have a fiber texture and a resulting composite material part that present very good mechanical behavior.

Figure 2:
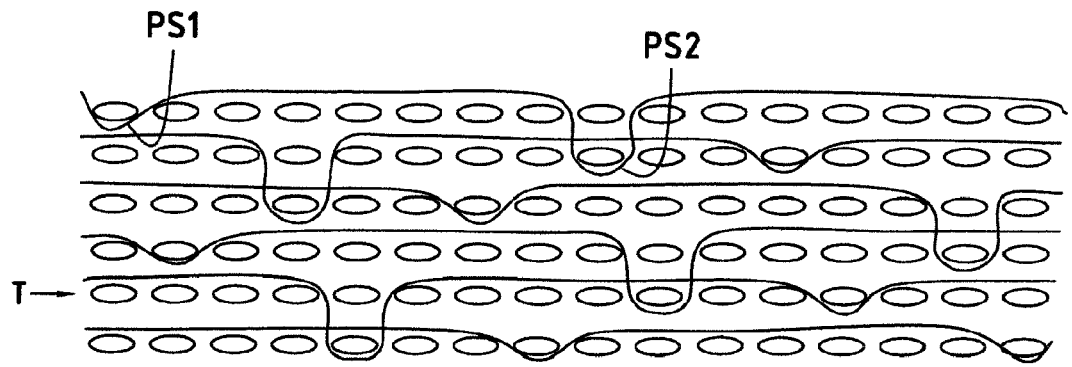
FIG. 2 shows a plane of a fiber texture weave obtained by satin type multi-layer weaving.

FIG. 2 shows a plane of a multi-layer 3D weave of the satin type interlacing layers of weft yarns T (the weft yarns not being placed in a staggered configuration).

Each warp yarn is periodically deflected from its path over a weft layer, in alternation to take hold of a weft yarn of that weft layer and to hold together a weft yarn of said weft layer and the weft yarn situated in the same column of the underlying adjacent weft layer. This forms conventional single satin interlacing points PS1 alternating with double satin interlacing points PS2 bonding together the yarns of two adjacent weft layers, and thus providing interlacing between the weft layers.

Nevertheless, the satin interlacing points PS2 constitute singular points with crossed weft yarns, thereby giving rise to significant irregularities in the fiber texture that can affect the mechanical behavior of a part that is obtained by densifying such a fiber texture. This drawback is particularly marked when the yarns used present a considerable degree of stiffness, for example yarns of ceramic or of small count. It is then difficult to impart deformation at the PS2 points that does not disturb the arrangement of the weft yarns.

That is why the invention seeks to provide multi-layer 3D weaving with a particular satin type weave or "multiple satin" weave that avoids such drawbacks.

Figure 3:
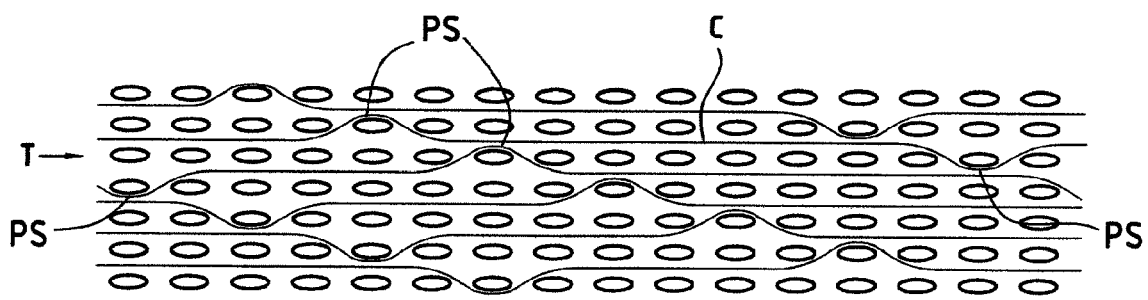
FIG. 3 shows a plane of a fiber texture weave obtained by multi-layer weaving with a multiple-satin weave in an embodiment of the invention.

A "multiple satin" weave plane in accordance with the invention is shown FIG. 3.

It comprises at least three layers of weft yarns T (seven layers in the example shown) together with warp yarns C, each warp yarn extending mainly between two respective adjacent layers of weft yarns.

Each warp yarn is deflected in alternation in one direction and in the other to take hold of in alternation one weft yarn in n of a first layer of weft yarns and one weft yarn in n of a second layer of weft yarns adjacent to the first, where n is an integer not less than 3, thereby providing interlacing between these two layers.

Since the number n is the same for all of the warp yarns, the travel or movement of all the weft yarns is similar, while being offset in the warp direction between consecutive weft yarns, such that the particular yarns of a given weft yarn layer that are taken by the warp yarns are different.

In such a multiple-satin weave, the term "pitch" is used herein to designate the interval between two PS satin points of a given warp yarn measured as a number of weft columns. In the example of FIG. 3, the pitch alternates between 6 and 10, giving a mean pitch of 8, i.e. n/2.

The yarns taken in the first weft yarn layer and the yarns taken in the second yarn layer by a given warp yarn are situated in different weft yarn columns, that are preferably non-adjacent so as to avoid the warp yarn following a path that is too sinuous, which can give rise to irregularities. Thus, the number n is advantageously not less than 5 in order to make this condition easier to satisfy.

The travel or movement of similar warp yarns is the same in all of the planes of the multiple-satin weave.

Compared with a prior art interlock weave of the kind shown in FIG. 1, the multiple-satin weave makes it possible to conserve good mechanical properties in the warp direction and to conserve a surface appearance that is more regular.

In addition, the fiber texture presents little warp shrinkage and presents deformability that enable it to match shapes that are not plane.

For a fiber texture having an inner portion, or core, and an outer portion, or skin, adjacent to an outside surface of the fiber texture, the skin may be made by weaving with a weave that is different from that of the core, for example by two-dimensional weaving with a plain, satin, or twill type so as to "close" the weaving at the surface, where a satin type weave also produces a surface appearance that is smooth. A variation of weave in the skin can be achieved at the outside surface of the fiber texture in order to impart desired particular properties, for example by going from a plain type weave that enhances tight interlacing to a satin type weave that enhances a smooth surface state.

When the fiber texture is for fabricating a composite material part with a matrix obtained by chemical vapor infiltration (CVI), it is also advantageous to obtain mechanical properties that are as little non-uniform as possible within the part, so as to enhance CVI densification with a densification gradient that is as small as possible between the core of the fiber texture and its skin.

To this end, the weaving of the core can be performed with yarns made of discontinuous fibers so as to encourage subdivision of its pores by the fibers bulking up and so as to encourage access for the reaction gas. It is possible to make use of yarns made up from discontinuous fibers having substantially no twist, cohesion being provided by a covering yarn. The covering yarn is advantageously made of a sacrificial material that is eliminated after weaving, thereby enabling the pores of the woven texture to be subdivided and helping reduce the gradient of CVI densification. Such yarns made up from discontinuous fibers with a sacrificial covering yarn are described in document EP 0 489 637.

It is also advantageous to encourage obtaining a surface state, after densification, that is free from irregularities, i.e. a good finish state so as to avoid or limit finishing operations by machining.

The skin can be made by weaving with yarns made up from continuous filaments so as to avoid discontinuous fiber bulking up.

Still for the purpose of enhancing access for the reaction gas, the skin may be made with a warp and/or a weft structure that presents a lower count than in the core.

It can be desirable to vary the count of the yarns used for weaving the fiber texture, in particular by using yarns with different counts in the core and the skin and/or between the warp and the weft. Using yarns of increasing fineness between the core and the skin encourages access to the core for the gas through the skin when densification is performed by CVI. The counts of the yarns can therefore be selected so as to obtain a ratio within desirable limits between the volume fraction of warp fibers and the volume fraction of weft fibers.

It is also possible to vary the multiple-satin weave within the core, by weaving different portions of the core with respective different multiple-satin weaves.

It is also possible to cause the weave to vary in the skin along the outside surface.

The chemical nature of the yarns is selected as a function of the intended application. It can be desirable to use yarns of different chemical natures between different portions of the fiber texture, in particular between the core portion and the skin portion in order to confer particular mechanical properties to the resulting composite material part, in particular properties of resistance to oxidation or to wear.

Thus, for a thermostructural material composite part with refractory fiber reinforcement, it is possible to use a fiber structure with carbon fibers in the core and ceramic fibers, e.g. silicon carbide (SiC) fibers, in the skin so as to increase the wear resistance of the composite part in said skin portion.

Two embodiments of a fiber structure in accordance with the invention are described below. In both examples, the weaving is performed on a Jacquard type loom.

EXAMPLE 1

Figure 4A:
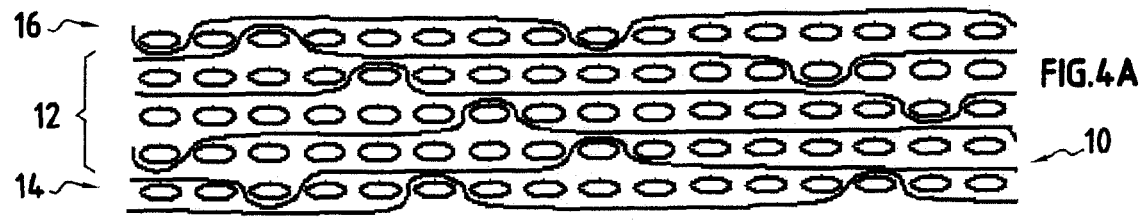
FIGS. 4A to 4P show successive planes of a weave of a fiber texture in another embodiment of the invention with multiple-satin weaving in its core and two-dimensional weaving with a satin weave in its skin.
Figure 4B:
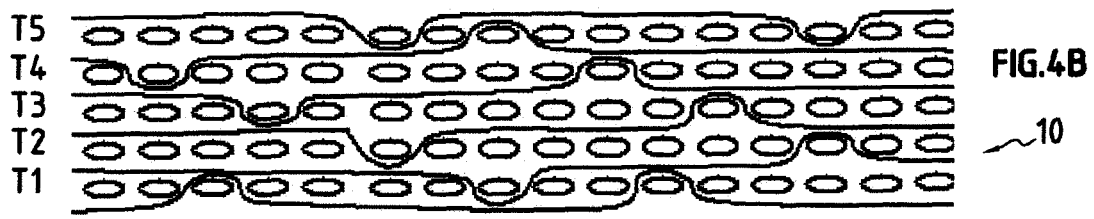
Figure 4C:
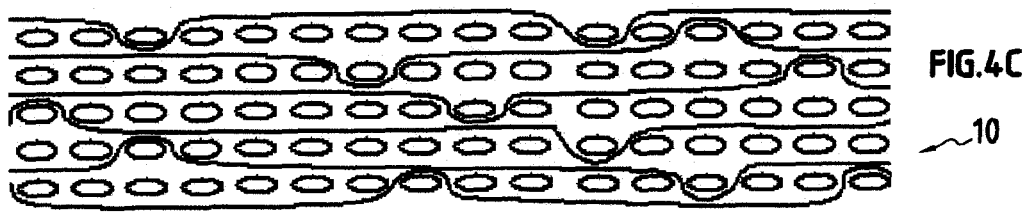
Figure 4D:
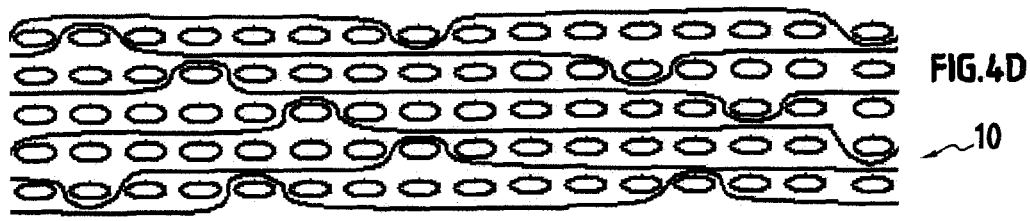
Figure 4E:
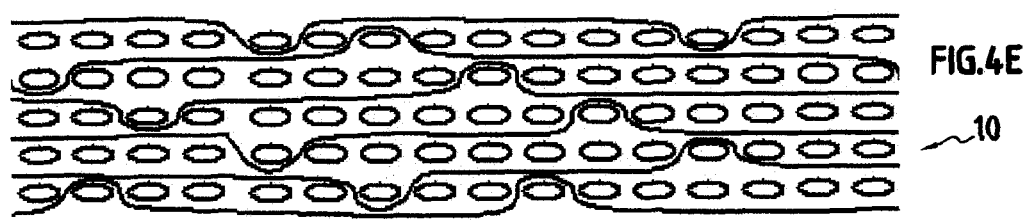
Figure 4F:
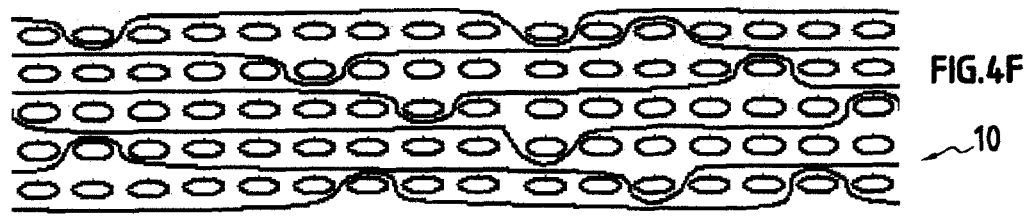
Figure 4G:
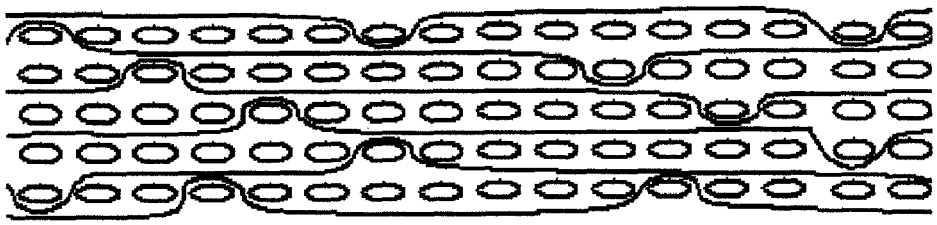
Figure 4H:
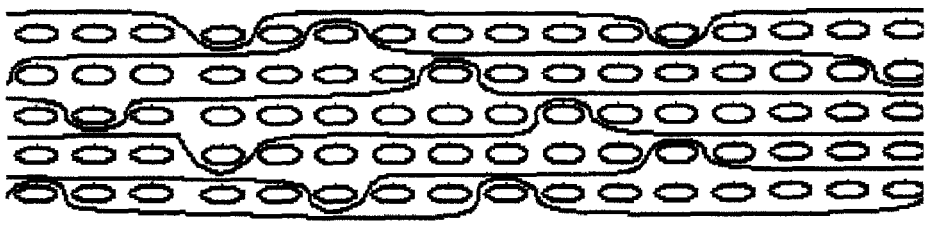
Figure 4I:
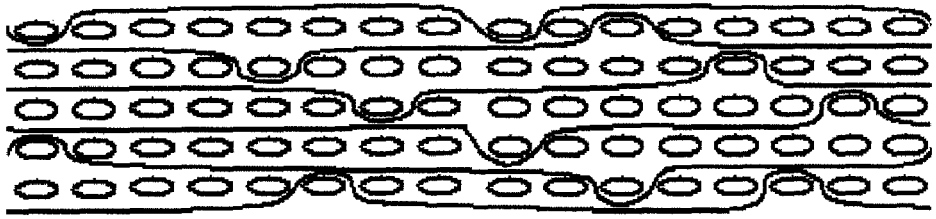
Figure 4J:
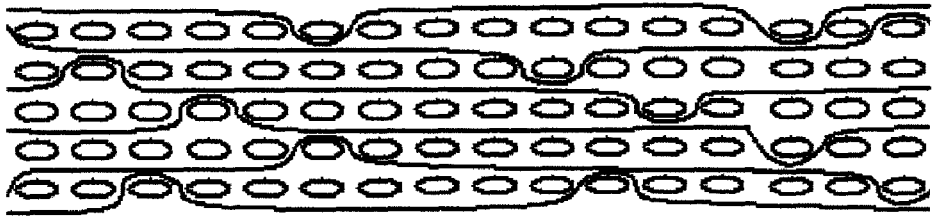
Figure 4K:
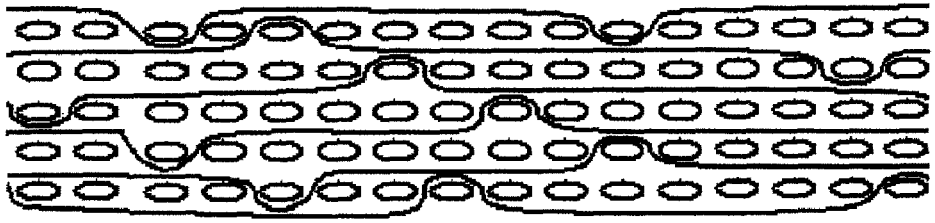
Figure 4L:
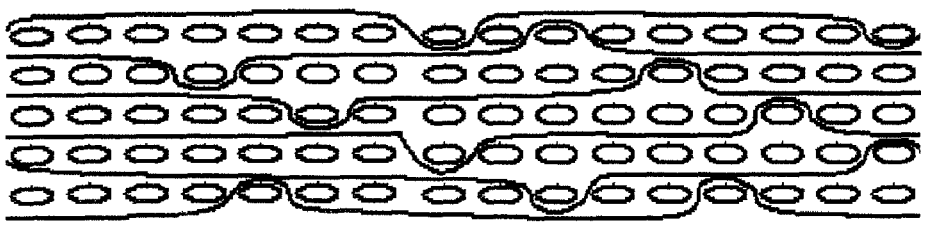
Figure 4M:
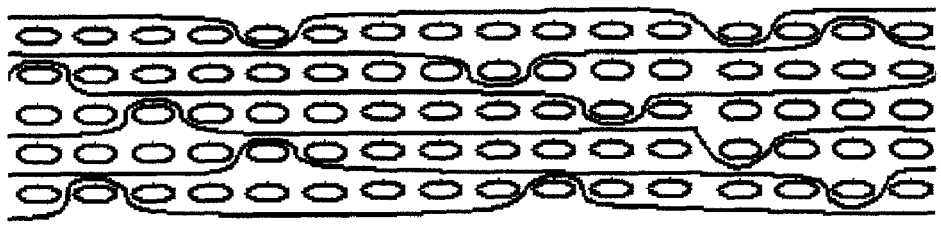
Figure 4N:
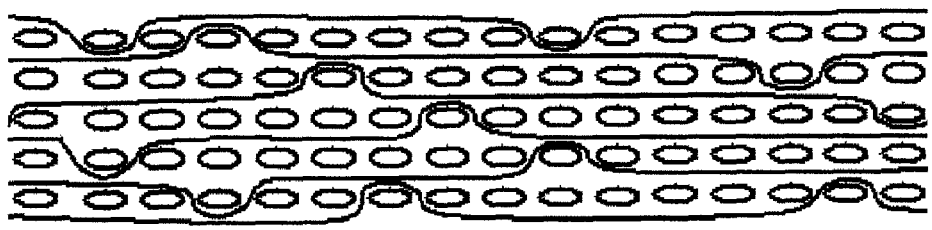
Figure 4O:
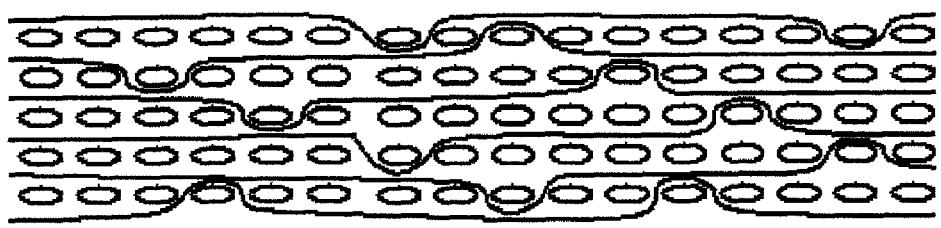
Figure 4P:
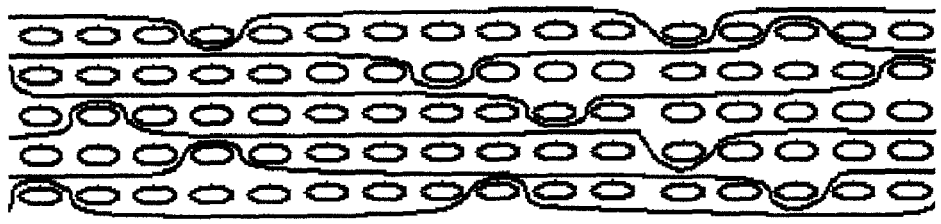
Figure 5A:
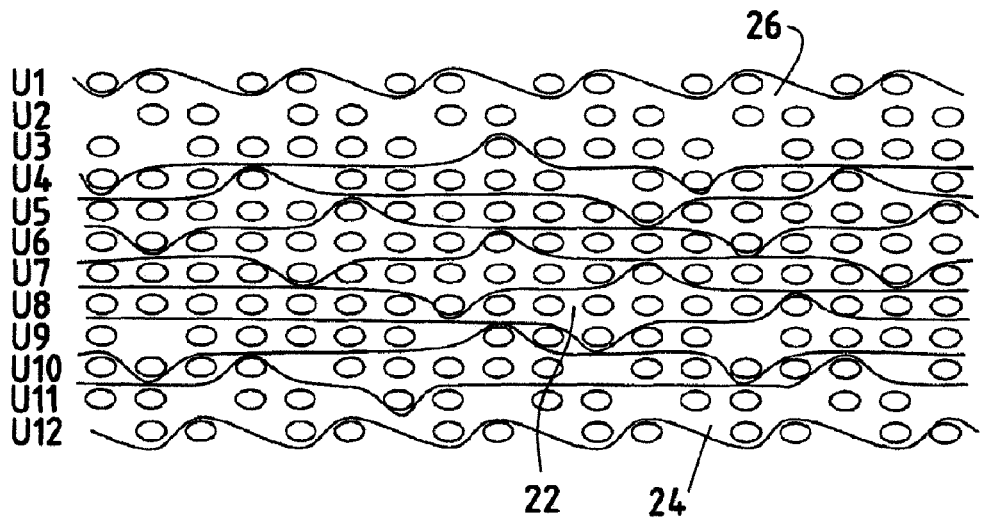
FIGS. 5A to 5L show successive planes of a weave of a fiber texture in another embodiment of the invention with a weave that combines two different multiple-satin weaves in its core and two-dimensional weaving with a plain weave in its skin.
Figure 5B:
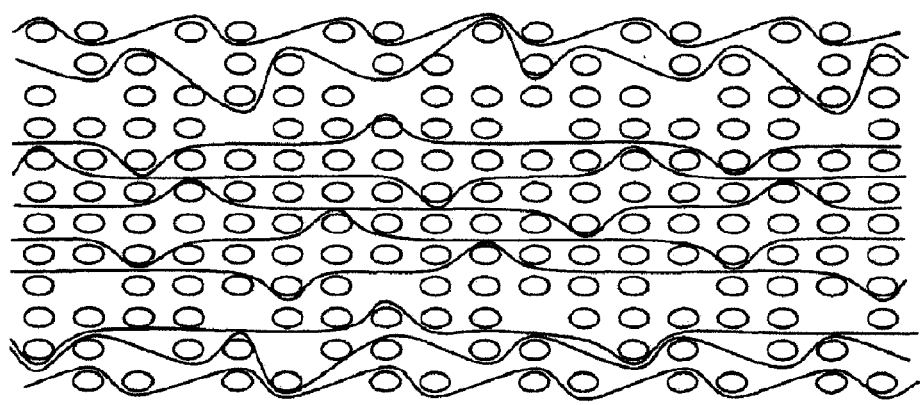
Figure 5C:
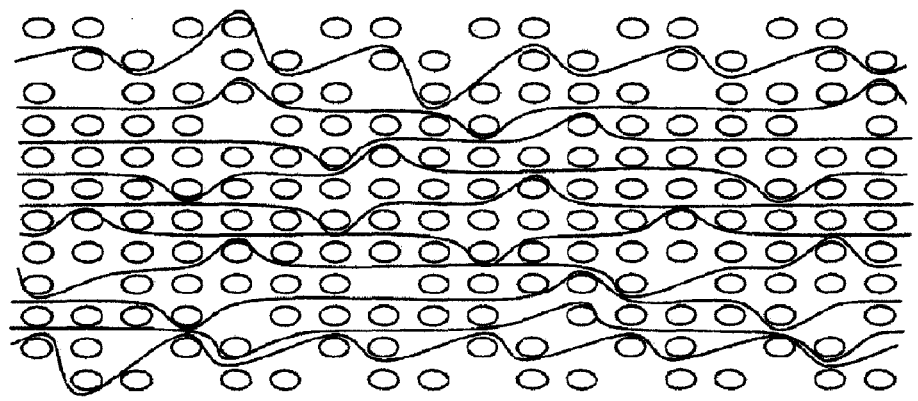
Figure 5D:
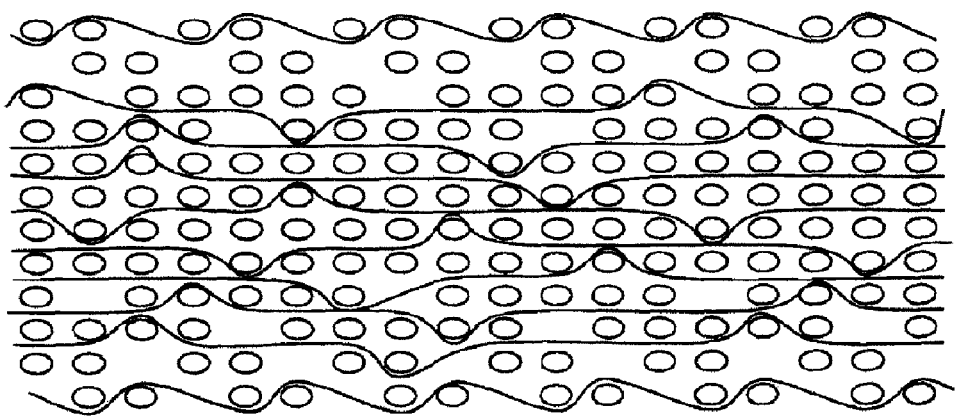
Figure 5E:
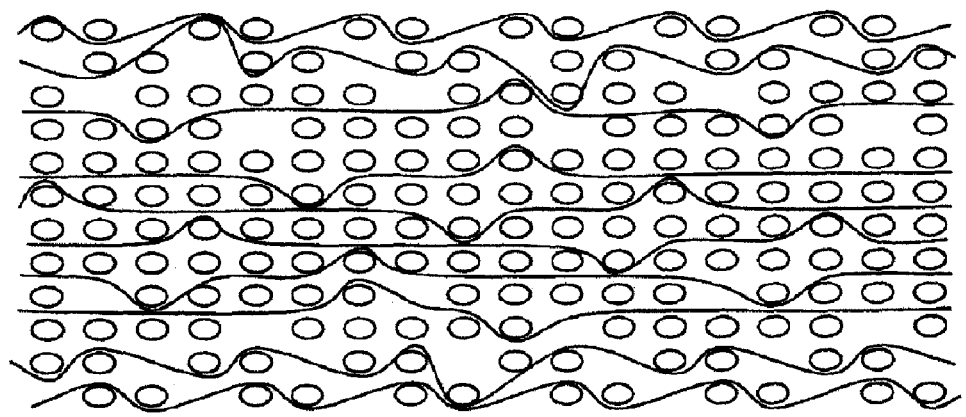
Figure 5F:
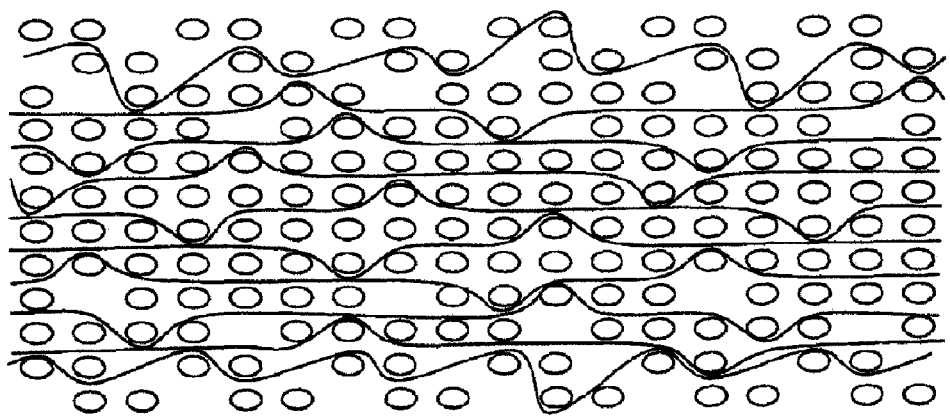
Figure 5G:
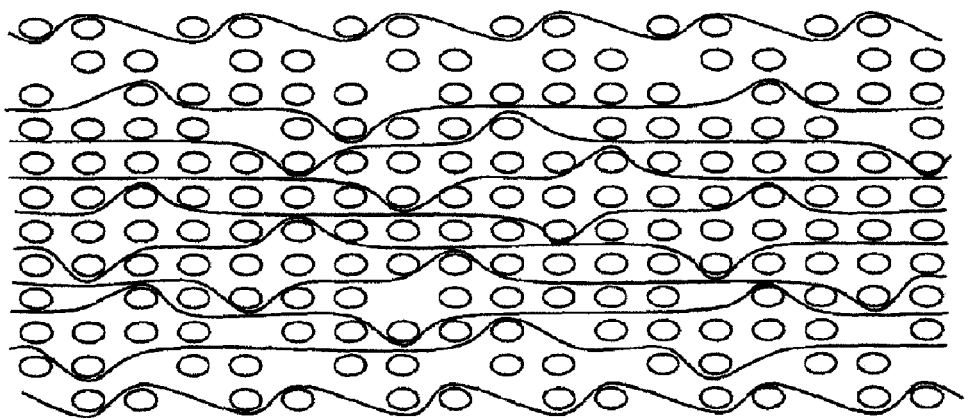
Figure 5H:
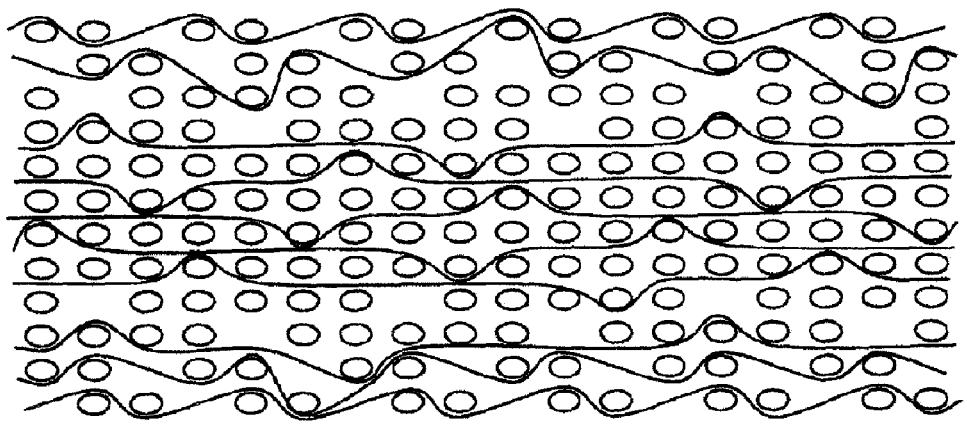
Figure 5I:
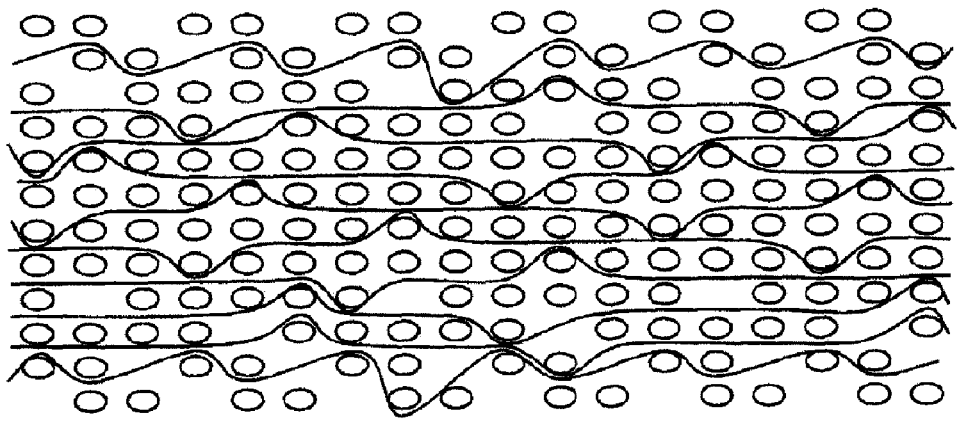
Figure 5J:
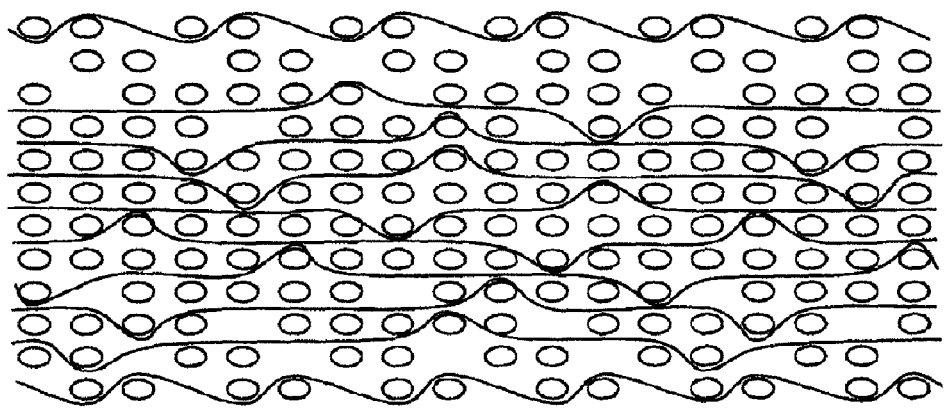
Figure 5K:
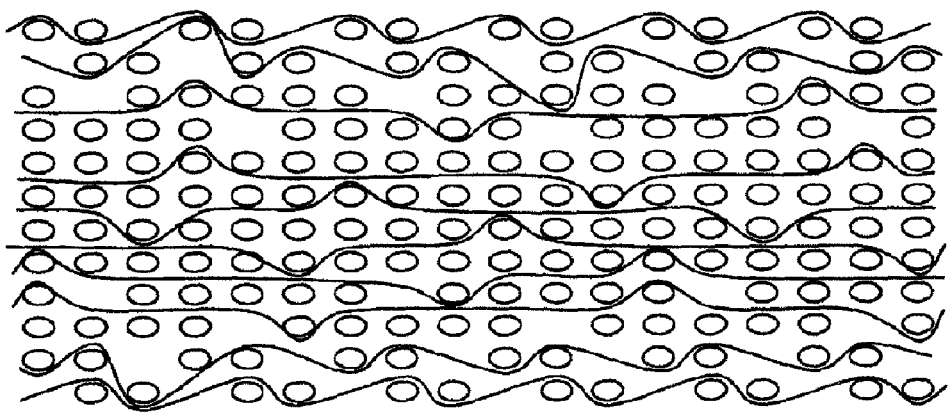
Figure 5L:
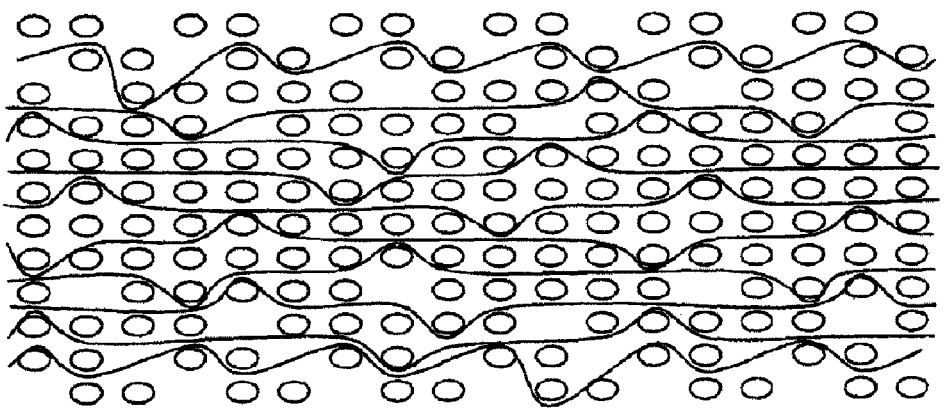

FIGS. 4A to 4P show successive planes of a fiber texture weave 10 obtained by 3D weaving with multiple satin three-dimensional weaving in the core and two-dimensional weaving in the skin 14, 16.

The weaving in the core is done with a multiple-satin weave having a pitch of 8, and the weaving of the skin is done with a satin weave also having a pitch of 8.

It can be seen that the satin interlacing points form patterns that are regular and distributed in the successive weave planes, without any marked alignment in the column or depth direction (from one weave plane to another).

The fiber texture 10 comprises five layers of weft yarns T1 to T5. In the core 12, situated between opposite skins 14 and 16, the multiple-satin weaving is performed with yarns made of discontinuous carbon fibers held together by a covering yarn of sacrificial material, as described in EP 0 489 637, and with a 10/10 structure in each layer (ten yarns per centimeter both in the weft direction and in the warp direction). By way of example, the covering yarn is made of a soluble polymer such as a polyvinyl alcohol or of a polymer that can be eliminated by heat treatment without affecting the carbon of the fibers, such as a polyethylene or a polyvinyl acetate. In the skins 14 and 16, the satin weave is woven using yarns made up of continuous carbon filaments and with a 10/10 structure. The weaving interlacing with the satin weave involves only the layers T1 and T5 of the weft yarns. It can be seen that the multiple-satin weaving of the core extends all the way to the skin weft layers so as to interlace these layers with the core layers.

Naturally, the yarns used for weaving in the core and in the skin could all be of the same type in a variant embodiment, i.e. they could all be made of discontinuous fibers or of continuous filaments.

EXAMPLE 2

FIGS. 5A to 5L show successive planes of a texture 20 obtained by multi-layer 3D weaving comprising 12 weft yarn layers U1 to U12. The table below summarizes the weaves and the 3D weaving structures used, weave variation in the texture 20 being symmetrical about a midplane, with the skins 24, 26 being situated on either side of the core 22. Certain weft layers have numbers of weft yarns that differ from the numbers of other layers, giving rise to weft structure variation.

| Weft yarn layers | Multi-layer weave | Structure |
| --- | --- | --- |
| U1 | Plain | 6.6/6.6 |
| U2 | Multiple-plain | 6.6/6.6 |
| U3 | Multiple 5-satin | 8/8 |
| U4 | Multiple 5-satin | 8/8 |
| U5 | Multiple 6-satin | 10/10 |
| U6 | Multiple 6-satin | 10/10 |
| U7 | Multiple 6-satin | 10/10 |
| U8 | Multiple 6-satin | 10/10 |
| U9 | Multiple 5-satin | 8/8 |
| U10 | Multiple 5-satin | 8/8 |
| U11 | Multiple plain | 6.6/6.6 |
| U12 | Plain | 6.6/6.6 |

In this example, the multiple-satin weave and the structure vary between the core and the skins. It can be seen that variation in the weave and the structure is made to be somewhat progressive by adopting a 5-satin for weft layers U3, U4 and U9, U10 between the 6-satin of layers U5 to U8 and the skin plain weave, thereby avoiding too sharp a discontinuity between the core and the skin.

In a variant, it will be possible to use a twill type weave for the multi-weaving of the skins.

The invention claimed is:

1. A reinforcing fiber texture for a composite material part, the texture being formed at least in part by multi-layer three-dimensional weaving with a multi-satin weave, the texture comprising:
   at least a first, a second, and a third adjacent layers of weft yarns with the weft yarns of the first, second, and third layers being disposed in columns each comprising a weft yarn from each of said layers;
   a first set of warp yarns each warp yarn extending between the first layer of weft yarns and the second layer of wefts yarns and being deflected in alternation in one direction and in an opposite direction for taking hold in alternation of one weft yarn out of a given number of weft yarns in the first layer of weft yarns and of one weft yarn out of said number of weft yarns in the second layer of weft yarns adjacent to the first layer; and
   a second set of warp yarns each warp yarn extending between the second layer of weft yarns and the third layer of wefts yarns and being deflected in alternation in one direction and in an opposite direction for taking hold in alternation of one weft yarn out of said given number of weft yarns in the second layer of weft yarns and of one weft yarn out of said given number of weft yarns in the third layer of weft yarns adjacent to the second layer;
   both sets of warp yarns following paths that are offset relative to each other in the warp direction such that in a given weft plane, the yarns of the second weft yarn layer taken by a warp yarn of the first set and by a warp yarn of the second set are different, the weft yarns of the first layer of weft yarns taken by a warp yarn of the first set and the weft yarns of the second layer of weft yarns taken by a warp yarn of the second set belong to different columns of weft yarns and the weft yarns of the second layer of weft yarns taken by a warp yarn of the first set and the weft yarns of the third layer of weft yarns taken by a warp yarn of the second set belong to different columns of weft yarns; and
   said given number being an integer not less than 3.

2. A fiber structure according to claim 1, wherein the weft yarns held by a same warp yarn in two of said layers of weft yarns are located in non adjacent columns of weft yarns.

3. A fiber texture according to claim 2, wherein said given number is greater than or equal to 5.

4. A fiber texture according to claim 1, having an inner portion or core and an outer portion or skin adjacent to an outside surface of the fiber texture, wherein the core is formed at least in part by said multi-satin weave.

5. A fiber texture according to claim 4, wherein the skin is formed by two-dimensional weaving.

6. A fiber texture according to claim 5, wherein the weaving of the skin has a satin weave.

7. A fiber texture according to claim 6, wherein the satin weave in the skin and the satin weave in a portion of the core adjacent to the skin have equal pitches.

8. A fiber texture according to claim 4, wherein the core has at least first and second portions formed by multi-satin weaving with respective different first and second satin pitches.

9. A fiber texture according to claim 4, in which the core is woven at least in part with yarns made of discontinuous fibers, and the skin is woven with yarns made of continuous filaments.

10. A fiber texture according to claim 1, having a structure in at least one of the warp direction and the weft direction that varies in a thickness direction of the structure.

11. A fiber texture according to claim 10, having an inner portion or core and an outer portion or skin adjacent to an outside surface of the structure, wherein variation in the structure in said at least one of the warp direction and the weft direction is in a decreasing direction from the core to the skin.

12. A fiber texture according to claim 1, in which the inner and outer portions of the fiber texture are made with yarns of different chemical natures.

13. A fiber texture according to claim 1, in which the weft and warp yarns used for weaving present a yarn count that varies within the fiber texture.

14. A composite material part having a reinforcing fiber texture according to claim 1, densified by a matrix.

15. A part according to claim 14, made of thermostructural composite material having a matrix that is formed at least in part by chemical vapor infiltration.

16. A fiber texture according to claim 1,
wherein there is provided an inner portion or core and an outer portion or skin adjacent to an outside surface of the fiber texture, wherein the core is formed at least in part by said multi-satin weave;
wherein the skin is formed by two-dimensional weaving;
wherein the weaving of the skin has a satin weave;
wherein the skin has a satin pitch that is equal to a satin pitch in a portion of the core adjacent to the skin;
wherein the core has at least first and second portions formed by multi-satin weaving with respective different first and second satin pitches; and
wherein the core is woven at least in part with yarns made of discontinuous fibers, and the skin is woven with yarns made of continuous filaments.

17. A fiber texture according to claim 16, in which the inner and outer portions of the fiber texture are made with yarns of different chemical natures.

18. A fiber texture according to claim 16, in which the inner and outer portions of the fiber texture are made with yarns of different chemical natures.

19. A fiber texture according to claim 11, in which the inner and outer portions of the fiber texture are made with yarns of different chemical natures.

20. A composite material part having a reinforcing fiber texture according to claim 16, densified by a matrix.

21. A composite material part having a reinforcing fiber texture according to claim 17, densified by a matrix.

22. A composite material part having a reinforcing fiber texture according to claim 18, densified by a matrix.

23. A composite material part having a reinforcing fiber texture according to claim 19, densified by a matrix.

24. A part according to claim 20, made of thermostructural composite material having a matrix that is formed at least in part by chemical vapor infiltration.

25. A part according to claim 21, made of thermostructural composite material having a matrix that is formed at least in part by chemical vapor infiltration.

26. A part according to claim 22, made of thermostructural composite material having a matrix that is formed at least in part by chemical vapor infiltration.

27. A part according to claim 23, made of thermostructural composite material having a matrix that is formed at least in part by chemical vapor infiltration.

\* \* \* \* \*